April 1, 1941.  J. A. BURKART  2,237,214
COLLAPSIBLE WHEEL CHUCK
Filed June 1, 1940

WITNESSES
INVENTOR
Joseph A. Burkart
BY
ATTORNEYS

Patented Apr. 1, 1941

2,237,214

UNITED STATES PATENT OFFICE 2,237,214

COLLAPSIBLE WHEEL CHUCK

Joseph A. Burkart, Albany, N. Y.

Application June 1, 1940, Serial No. 338,339

2 Claims. (Cl. 188—32)

This invention relates to chucks or chocks used in connection with wheels and particularly automobile wheels, an object being to provide a construction which may be folded and placed in a tool box and readily unfolded and placed against the wheel of an automobile to prevent or resist movement thereof.

Another object of the invention is to provide a chuck formed with a base and an arc-shaped wheel-fitting member, together with a brace for holding the parts in functioning position while permitting ready collapsing of the parts when desired.

Another object of the invention is to provide a chuck for vehicle wheels having a base adapted to fit on the ground or other supporting surface and a pivotally mounted arc-shaped wheel-receiving member adapted to fit a wheel when in functioning position.

In the accompanying drawing—

Figure 1:
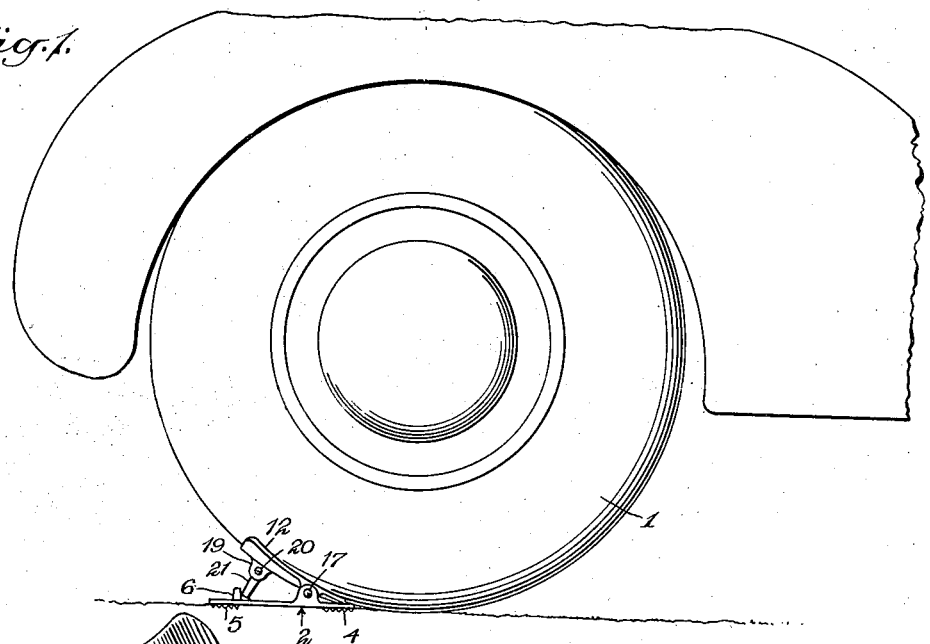
Fig. 1 is a side view of an automoblie wheel and part of an automobile body together with a chuck embodying the invention.

Referring to the accompanying drawing by numerals, 1 indicates a wheel and 2 a chuck adapted to be positioned as shown in Fig. 1 to prevent or resist movement of the wheel 1. In connection with vehicles, one chuck may be used or one chuck for each wheel as preferred.

Figure 2:
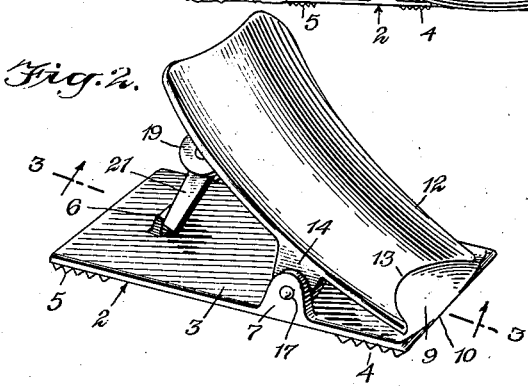
Fig. 2 is an enlarged perspective view of the chuck shown in Fig. 1.
Figure 5:
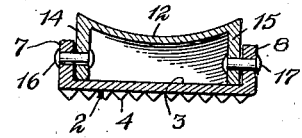
Fig. 5 is a transverse sectional view through Fig. 3 approximately on the line 5—5.
Figure 3:
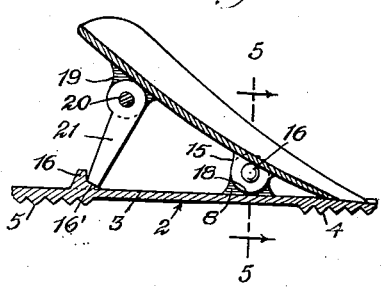
Fig. 3 is a longitudinal sectional view through Fig. 2 approximately on the line 3—3.
Figure 4:
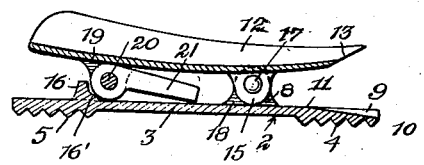
Fig. 4 is a view similar to Fig. 3 but showing the parts folded or collapsed.

The chuck 2 is provided with a base 3, which base is rectangular and is preferably made of metal. This base is provided with zones 4 and 5, or protuberances, which are adapted to sink into the ground when used thereon as shown in Fig. 1. On the opposite surfaces to the zones 4 and 5, there is provided a stop or abutment 6 and a pair of apertured ears 7 and 8. At one end the upper surface of the base plate 3 is provided with a tapering inclined zone 9. This zone tapers from the comparatively narrow or sharp edge 10 to the surface of the plate at 11. Coacting with plate 3 there is provided a wheel-receiving member 12. This member is arc-shaped in cross section, as shown in Fig. 5, whereby it is adapted to fit an automobile tire. The lower end of the member 12 is provided with an arc-shaped notch 13, as shown in Fig. 2, said notch fitting around the edge 11 of zone 9. This allows the chuck to be fitted nicely against the wheel 1 when the device is in use. The member 6 is provided with apertured ears 14 and 15 and these ears are provided with journal pins 16 and 17 which also extend through the ears 14 and 15 to pivotally connect member 12 with the base plate 3. The ears 14 and 15 are provided with arc-shaped or rounded lower ends 18, as shown particularly in Figs. 3 and 4, so as to slidingly contact the upper surface of the plate 3, whereby any appreciable pressure on the member 12 will be communicated through the ears 14 and 15 to plate 3 instead of through the respective pins. It will be understood that a certain amount of strain will be taken up by the pins but most of the strain will be communicated directly to plate 3 through the ears 14 and 15.

On the rear surface of the arc-shaped wheel-receiving member 12, there is provided a pair of lugs 19 carrying a pin 20. A brace 21 has its apertured end extending between the lugs 19 so that the pin 20 may extend therethrough and pivotally connect the parts together. Brace 21 is adapted to engage the base plate 3 at the abutment 16 or rather at the juncture 16' of the abutment and base plate 3. This properly supports the wheel-receiving member 12 in its functioning position. When the brace 21 is in the position shown in Fig. 3, the arc-shaped edge 13 is contacting the base plate 3, but there is sufficient looseness to permit the brace 21 to be swung forwardly or to the position shown in Fig. 1 when it is desired to store the device in a tool box or other place. It will, therefore, be readily seen that the device may be easily folded or unfolded.

I claim:

1. A wheel chuck including a base plate having on one surface near one end a pair of spaced apertured ears and near the other end an abutment, a wheel-receiving arc-shaped member provided near one end with a pair of apertured ears formed with round ends positioned to contact said base plate adjacent the ears on the base plate, journal pins extending through the respective ears for pivotally connecting the arc-shaped member to said base plate so that pressure on the arc-shaped member will be transmitted through the rounded ends of the ears on the arc-shaped member to the base plate and a brace pivotally mounted on the rear surface of the arc-shaped member and positioned to engage the base plate at the juncture of said abutment therewith for holding said arc-shaped member at an angle to the base plate.

2. A wheel chuck including a substantially rectangular base plate having at one end in one surface a tapering zone extending from a narrow edge at one end of the base plate toward the other end and merging into the surface of the base plate, a pair of ears on the same surface as said tapering zone and near said zone, an arc-shaped wheel-receiving member arc-shaped in cross-section provided with ears coacting with the ears on the base plate for pivotally mounting the arc-shaped wheel-receiving member to the base plate, said arc-shaped wheel-receiving member having an arc-shaped notch at one end adapted to extend around one end of said tapering zone when the arc-shaped wheel-receiving member is in functioning position and a brace for holding the arc-shaped wheel-receiving member at an angle to the base plate and in functioning position.

JOSEPH A. BURKART.